US005249256A

United States Patent [19]

Sado et al.

[11] Patent Number: 5,249,256

[45] Date of Patent: Sep. 28, 1993

[54] ELECTRONIC INSTRUMENT FOR PUTTING OUT INFORMATION IN THE FORM OF VOICE

[75] Inventors: Ichiro Sado; Juji Kishimoto, both of Tokyo; Masayuki Sasaki, Yokohama; Mitsuo Cho, Ibaraki, all of Japan

[73] Assignee: Canon Kabushiki Kaisha, Tokyo, Japan

[21] Appl. No.: 888,432

[22] Filed: May 28, 1992

Related U.S. Application Data

[63] Continuation of Ser. No. 593,521, Oct. 10, 1990, abandoned, which is a continuation of Ser. No. 425,354, Oct. 21, 1989, abandoned, which is a continuation of Ser. No. 866,126, Jan. 14, 1985, abandoned, which is a continuation of Ser. No. 465,102, Feb. 9, 1983, abandoned, which is a continuation of Ser. No. 267,651, May 27, 1981, abandoned, which is a continuation of Ser. No. 89,455, Oct. 30, 1979, abandoned.

[30] Foreign Application Priority Data

Nov. 9, 1978 [JP] Japan ............................. 53-138189

[51] Int. Cl.$^5$ .............................................. G10L 9/00
[52] U.S. Cl. .......................................................... 395/2
[58] Field of Search ....................................... 381/51-53; 395/2

[56] References Cited

U.S. PATENT DOCUMENTS

| | | | |
|---|---|---|---|
| 3,654,619 | 4/1972 | Tishman | 35/6 |
| 3,808,705 | 5/1974 | Schmoyer | 35/6 |
| 3,947,976 | 4/1976 | Hafel | 35/31 C |
| 3,998,045 | 12/1976 | Lester | 364/710 |
| 4,022,097 | 5/1977 | Strangio | 84/464 |
| 4,179,584 | 12/1979 | Tanimoto et al. | 179/1 SM |

Primary Examiner—Michael R. Fleming
Assistant Examiner—Michelle Doerrler
Attorney, Agent, or Firm—Fitzpatrick, Cella, Harper & Scinto

[57] ABSTRACT

An electronic device comprises a first memory for storing a plurality of words which are to be displayed on a display coupled to the first memory and a second memory for storing a plurality of voice information codes each corresponding to a portion of a different one of the plurality of words stored in the first memory. The second memory also stores a specific code for distinguishing each of the plurality of voice information codes and stores each of the plurality of voice information codes and the specific code so that the voice information codes and the specific code are alternatively read out. The electronic device also comprises a converter connected to the second memory for converting the plurality of voice information codes stored in the second memory into audible sound, a detector connected to the second memory for detecting a specific code to produce a detecting signal, and an indicator arranged in parallel to the display and connected to the detector for indicating, in response to a detecting signal of the detector, the portion of the word displayed by the display which corresponds to the voice information code converted into an audible sound by the converter.

11 Claims, 1 Drawing Sheet

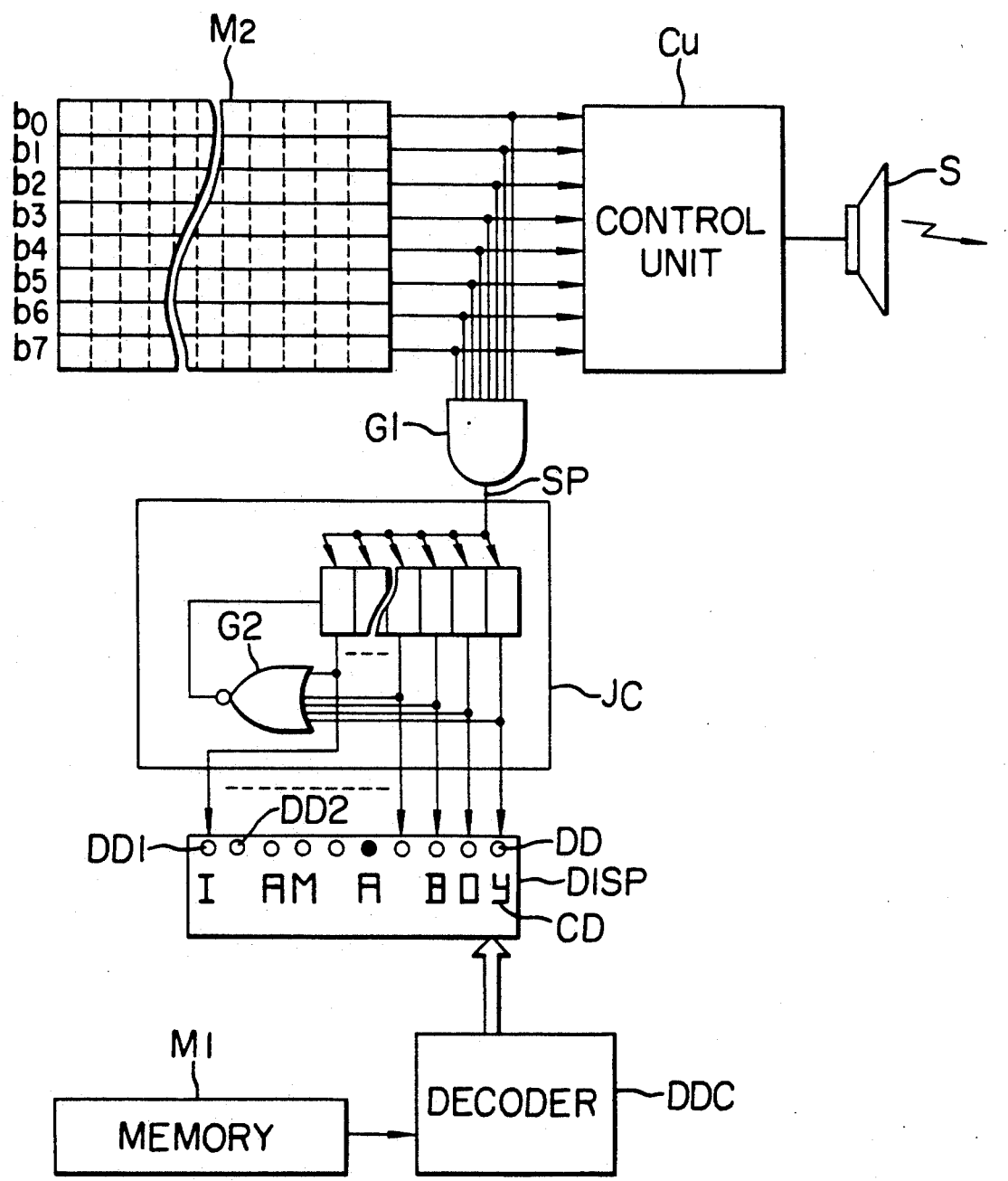

ELECTRONIC INSTRUMENT FOR PUTTING OUT INFORMATION IN THE FORM OF VOICE

This application is a continuation of application Ser. No. 07/593,521 filed Oct. 10, 1990, now abandoned, which in turn is a continuation application of Ser. No. 07/425,354 filed Oct. 21, 1989, now abandoned, which in turn is a continuation application of Ser. No. 06/866,126 filed Jan. 14, 1985, now abandoned, which in turn is a continuation application of Ser. No. 06/465,102 filed Feb. 9, 1983, now abandoned, which in turn is a continuation application of Ser. No. 06/267,651 filed May 27, 1981, now abandoned, which in turn is a continuation application of Ser. No. 06/089,455 filed Oct. 30, 1979, now abandoned.

BACKGROUND OF THE INVENTION

1. Field of the Invention

This invention relates to an electronic instrument which puts out information in the form of voice.

2. Description of the Prior Art

In desk top type electronic calculators or small translating machines which put out displayed content in the form of voice, when the displayed content is put out in the form of voice, unaccustomed users have often been at a loss as to which of the alphanumerics being displayed is being put out in the form of voice. Also, where voice content is stored in the form of binary code, the voice is stored in binary coded form, but even if the difference between a voice and the previous voice is coded and compressed to decrease the amount of memory, a large memory is required as compared with the displayed content and it is therefore difficult to synchronize displayed alphanumerics being put out in the form of voice with the other displayed alphanumerics in order to distinguish the former from the latter.

Particularly, in the English language or the French language, not only pronunciation and characters are in discord but also speed of pronunciation differs and it is therefore difficult to effect synchronization.

SUMMARY OF THE INVENTION

In view of the foregoing points, it is an object of the present invention to provide an electronic instrument in which specific signals are stored in a memory having stored therein voices so that, on the basis of such signals, those of displayed alphanumerics which are being put out in the form of voice may be distinguished from the other displayed alphanumerics.

According to the present invention, there is provided an electronic instrument for displaying alphanumerics in a plurality of columns and putting out the displayed alphanumerics in the form of voice and wherein the displayed alphanumeric corresponding to said voice can be distinguished from the other displayed alphanumerics.

Other objects of the present invention will become apparent from the following detailed description of an embodiment of the invention taken in conjunction with the accompanying drawing.

BRIEF DESCRIPTION OF THE DRAWING

The FIGURE is a block diagram showing an embodiment of the present invention.

DESCRIPTION OF THE PREFERRED EMBODIMENTS

In the FIGURE, M1 designates a memory in which alphanumerics to be displayed are stored in coded form.

M2 designates a memory, such as a ROM (Read Only Memory), a RAM (Random Access Memory) or a shift register in which voices for the alphanumerics stored in the memory M1 are stored in coded form.

The contents of such memory M2 are signals of the voice codes of the alphanumerics and specific codes between the voice codes of the alphanumerics stored in the memory M1. For example, if voice codes and specific codes are stored in a shift register, it is arranged such that the voice codes and the specific codes are alternately put out. If the memory M2 is a ROM or a RAM, it is arranged such that the voice codes and the specific codes are alternately put out in accordance Here, the arrangement of voice codes and specific codes is considered with displayed characters as the standard in order to know which of the displayed characters (including numeric characters) is being put out in the form of voice.

In this embodiment, the memory M2 represents the voice code of a character or a numeric in eight bits and so, it stores a binary signal of (11111111) as the specific code.

CU designates a control unit which receives the voice codes from the memory M2 and converts the same into voice signals to sound a speaker S.

G1 designates an AND gate for detecting the specific code stored in the memory M2 when such specific code has been put out.

JC is a Johnson counter (ring counter) which has a number of output terminals corresponding to the number of alphanumerics that can be displayed by a display portion to be described and which shifts the signal of "1" in the counter with the specific code detection signal of the AND gate G1 as the shift pulse.

DISP designates a display portion for displaying the alphanumerics stored in the memory M1. The DISP receives the content of the memory M1 through a decoder DDC. The display portion DISP also has dot display members DD, for example, on alphanumeric display members CD. Such dot display members DD may be turned on and turned off by the outputs of the aforementioned Johnson counter JC.

Description will now be made of the operation of the embodiment having the above-described construction. For example, assume that binary codes of characters "I AM A BOY" are stored in the memory M1 and that specific codes are stored in the memory M2 with the voice codes of these characters and the characters stored in the memory M1 being as the unit. The Johnson counter JC shown in the FIGURE is cleared in its initial conditions and all the outputs of the Johnson counter JC are then 0. Accordingly, all the dot display members DD of the display portion DISP are turned off and the content of the memory M1 is being displayed by the display portion DISP through the decoder DDC.

Now, when the content of the memory M2 is read out in the aforementioned order of arrangement of the characters by access means, a specific code is first read out. Accordingly, the AND gate G1 detects the specific code and therefore, the output thereof becomes "1". Since at this time all the memories of the Johnson counter JC are cleared, a NOR gate G2 which receives the outputs of such memories puts out "1" and the output "1" of the NOR gate G2 is written into one of the memories of the Johnson counter JC by the output "1" of the AND gate G1, so that DD1 of the dot display members DD is turned on.

Subsequently, a voice code corresponding to "I" being displayed on the display portion DISP is read out from the memory M2 and converted into a voice signal by the control unit CU and put out from the speaker S.

When a voice code is being read out from the memory M2, the AND gate G1 is putting out an output of 0. As a matter of course, there is no voice code identical to the specific code. Accordingly, when a voice corresponding to the character "I" is flowing out of the speaker S, the dot display member DD1 continues to be turned on and, when the next specific code is read out, the AND gate G1 puts out a signal of "1" and such signal varies the content of the memories of the Johnson counter JC to turn on the dot display member DD2 next to the dot display member DD1 of the display portion DISP and turn off the dot display member DD1.

As described above, the position of the dot display member turned on changes each time a specific code is read out.

By the voice codes and specific codes of the memory M2 being successively read out in the manner described above, the operator can know, from the dot display, which of the alphanumerics being displayed is being put out in the form of voice.

In the foregoing embodiment, the dot display members are turned on, but it is also readily possible to directly turn on and off alphanumerics being displayed or to vary the quantity of light by inserting a gate in the signal line from the decoder DDC and controlling such gate in accordance with the output signal of the AND gate G1. Also, if design is made such that the content of the memory M1 is shifted by the signal of the AND gate G1, the content displayed may be readily shifted. Also, instead of vocalizing the specific codes delaying the previous voice in the meantime may be readily realized by adding a delay element to the control unit CU.

As has been described above, the present invention is designed such that in addition to voice codes, specific codes are stored and by reading such specific codes, which of the alphanumerics being displayed is being put out in the form of voice can be identified and thus, the user can know which of the alphanumerics being displayed is being put out in the form of voice.

What we claim is:

1. An electronic instrument, comprising:
  a first memory for storing a plurality of words of alphanumeric characters which are to be displayed;
  display means, capable of displaying a sentence by displaying a plurality of words of alphanumeric characters and coupled to said first memory, for displaying the plurality of words of alphanumeric characters stored in said first memory;
  a second memory for storing a plurality of voice information codes representing the plurality of words of alphanumeric characters stored in said first memory, and for storing a specific code for distinguishing each of the plurality of voice information codes, wherein said second memory is adapted to store each voice information code of the words of alphanumeric characters in said first memory and specific codes so that a specific code is read out at least once after each reading-out of any of said voice information codes;
  conversion means, connected to said second memory, for converting said plurality of voice information codes stored in said second memory into audible sounds of the plurality of words stored in said first memory;
  detecting means, connected to said second memory, for detecting a specific code each time a specific code is read out of said second memory after reading-out of one of the voice information codes to be converted by said conversion means, and for producing a detecting signal in response to detecting the specific code; and
  indicating means, arranged parallel to said display means and connected to said detecting means to receive detecting signals therefrom, for indicating a different alphanumeric character portion of the plurality of words displayed by said display means each time a detecting signal is received from said detecting means, each indicated alphanumeric character portion corresponding to the voice information code representing the indicated alphanumeric character portion and converted into an audible sound by said conversion means.

2. An electronic instrument according to claim 1, wherein said conversion means comprises a loudspeaker.

3. An electronic instrument according to claim 1, wherein said indicator means comprises an indicator element for indicating the portion of the word displayed by said display means which corresponds to the voice information code converted into an audible sound by said conversion means.

4. An electronic instrument according to claim 1, wherein said indicator means comprises counter means for counting the detecting signals to produce, in response to a count accumulated therein, a signal indicating the portion of the word which corresponds to the voice information code converted into an audible sound.

5. An electronic instrument according to claim 4, wherein said indicator means comprises an indicator element for indicating, in response to a count accumulated in said counter, the portion of the word which corresponds to the voice information code converted into the audible sound.

6. An electronic instrument, comprising:
  a first memory for storing a plurality of words of alphanumeric characters which are to be displayed;
  display means, capable of displaying a sentence by displaying a plurality of alphanumeric character words and coupled to said first memory, for displaying the plurality of alphanumeric character words stored in said first memory;
  a second memory for storing a plurality of voice information codes representing the plurality of alphanumeric character words stored in said first memory, and for storing a specific code for distinguishing each of the plurality of voice information codes, wherein said second memory is adapted to store each voice information code of the alphanumeric character words in said first memory and specific codes so that both are read out with the specific code being read out at least once after each reading-out of any of the voice information codes;
  conversion means, connected to said second memory, for converting said plurality of voice information codes stored in said second memory into audible sounds of the plurality of words stored in said first memory;

detecting means, connected to said second memory, for detecting a specific code each time a specific code is read-out of sad second memory after reading-out of any of the voice information codes to be converted by said conversion means and for producing a detecting signal in response to detecting the specific code;

counter means, connected to said detecting means, for counting the number of said detecting signals and outputting a signal each time a detecting signal is received; and indicating means, arranged parallel to said display means and connected to said counter means to receive a signal therefrom, for indicating a different alphanumeric character portion of the plurality of words displayed by said display means each time a signal is received from said counter means, each indicated alphanumeric character portion corresponding to the voice information code representing the indicated alphanumeric character portion converted into an audible sound by said conversion means.

7. An electronic instrument according to claim 6, wherein said counter means is a Johnson counter.

8. A voice output display device comprising:

first memory means for storing a plurality of alphanumeric characters forming a group of words;

display means, coupled to the first memory means, for displaying the plurality of alphanumeric characters of the group of words stored in said first memory means;

second memory means for storing voice codes representing the alphanumeric characters of the group of words in said first memory means and specific codes distinguishing the voice codes, the voice codes and specific codes adapted to be outputted from said second memory means while the alphanumeric characters of the group of words are displayed with at least one specific code being outputted after the outputting of each voice code;

conversion means, coupled to said second memory means, for converting the voice codes outputted from the second memory means into sounds of the plurality of alphanumeric characters stored in said first memory means;

detecting means, coupled to said second memory means, for detecting the specific codes outputted from said second memory means each time a specific code is read out of said second memory means after reading-out of any voice code to be converted by said conversion means, and indicating means, coupled to said detecting means and responsive to the detected specific codes, for indicating a different alphanumeric character of the displayed group of words each time said detecting detects a specific code, each indicated alphanumeric character portion of the displayed group of words corresponding to the voice code representing the indicated alphanumeric character portion being converted to sound.

9. An electronic instrument for indicating the portion of a plurality of words of alphanumeric characters stored in a first memory and displayed by display means that is output by conversion means for converting a plurality of voice information codes representing the plurality of displayed words, stored in a second memory also storing a specific code for distinguishing each of the plurality of voice information codes so that the specific code is read-out at least once after each reading-out of any of the voice information codes, into audible sounds of the plurality of words stored in the first memory, said instrument comprising:

detecting means, connected to the second memory, for detecting the specific code each time the specific code is read-out of the second memory after reading out of one of the voice information codes to be converted by the conversion means and for producing a detecting signal in response to detecting the specific code; and indicating means, arranged parallel to the display means and connected to said detecting means to receive detecting signals therefrom, for indicating a different alphanumeric character portion of the plurality of words displayed by the display means each time a detecting signal is received from said detecting means, each indicated alphanumeric character portion corresponding to the voice information code representing the indicated alphanumeric character portion and converted into an audible sound by the conversion means.

10. An electronic instrument for indicating the portion of a plurality of words of alphanumeric characters stored in a first memory and displayed by display means that is output by conversion means for converting a plurality of voice information codes representing the plurality of displayed words, stored in a second memory also storing a specific code for distinguishing each of the plurality of voice information codes so that both are read out with the specific code being read out at least once after each reading out of any of the voice information codes, into audible sounds of the plurality of words stored in the first memory, said instrument comprising:

detecting means, connected to the second memory, for detecting the specific code each time the specific code is read out of said second memory after reading out of any of the voice information codes to be converted by the conversion means and for producing a detecting signal in response to detecting the specific code;

counter means, connected to said detecting means, for counting the number of the detecting signals and outputting a signal each time a detecting signal is received; and indicating means, arranged parallel to the display means and connected to said counter means to receive a signal therefrom, for indicating a different alphanumeric character portion of the plurality of words displayed by the display means each time a signal is received from said counter means, each indicated alphanumeric character portion corresponding to the voice information code representing the indicated alphanumeric character portion converted into an audible sound by the conversion means.

11. An indicating device for indicating the portion of a group of words of a plurality of alphanumeric character stored in first memory means and displayed by display means that is output by conversion means for converting a plurality of voice codes representing the displayed group of words of the plurality of alphanumeric characters, stored in second memory means also storing specific codes distinguishing the voice codes so that the voice codes and specific codes are outputted from the second memory means while the alphanumeric characters of the group of words are displayed with at least one specific code being outputted after the outputting of each voice code, into sounds of the plurality of alphanumeric characters stored in the first memory means, said device comprising:

detecting means, coupled to the second memory means, for detecting the one specific codes outputted from the second memory each time the one specific code is read out of the second memory after reading out of any voice code to be converted by the conversion means; and indicating means, coupled to said detecting means and responsive to the detected specific codes, for indicating a different alphanumeric character portion of the displayed group of words each time said detecting means detects the one specific code, each indicated alphanumeric character portion of the displayed group of words corresponding to the voice code representing the indicated alphanumeric character portion converted to sound by the conversion means.

* * * * *

UNITED STATES PATENT AND TRADEMARK OFFICE
CERTIFICATE OF CORRECTION

PATENT NO. : 5,249,256
DATED : September 28, 1993
INVENTOR(S) : ICHIRO SADO, ET AL.

It is certified that error appears in the above-indentified patent and that said Letters Patent is hereby corrected as shown below:

COLUMN 2

Line 18, "accordance" should read --accordance with an instruction from an address counter.--.
    Line 63, "means,,a" should read --means, a--.

COLUMN 3

Line 38, "codes" should read --codes,--.

COLUMN 5

Line 5, "sad" should read --said--.
    Line 53, "means," should read --means;--.

Signed and Sealed this

Seventeenth Day of May, 1994

Attest:

BRUCE LEHMAN

Attesting Officer      Commissioner of Patents and Trademarks